US010961146B2

(12) United States Patent
Molieres et al.

(10) Patent No.: US 10,961,146 B2
(45) Date of Patent: *Mar. 30, 2021

(54) TRANSPARENT, ESSENTIALLY COLORLESS, TIN-FINED LAS GLASS-CERAMICS WITH IMPROVED MICROSTRUCTURE AND THERMAL EXPANSION PROPERTIES

(71) Applicant: EUROKERA, Jouarre (FR)

(72) Inventors: Estelle Molieres, Fontainebleau (FR); Marie Jacqueline Monique Comte, Fontenay aux Roses (FR)

(73) Assignee: EUROKERA, Jouarre (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/577,980

(22) PCT Filed: May 27, 2016

(86) PCT No.: PCT/EP2016/062071
§ 371 (c)(1),
(2) Date: Nov. 29, 2017

(87) PCT Pub. No.: WO2016/193171
PCT Pub. Date: Dec. 8, 2016

(65) Prior Publication Data
US 2018/0290919 A1 Oct. 11, 2018

(30) Foreign Application Priority Data

May 29, 2015 (FR) ...................... 1554891

(51) Int. Cl.
*C03C 10/00* (2006.01)
*C03C 3/087* (2006.01)
(52) U.S. Cl.
CPC .......... *C03C 10/0027* (2013.01); *C03C 3/087* (2013.01)

(58) Field of Classification Search
CPC ................ C03C 10/0009; C03C 10/0027
See application file for complete search history.

(56) References Cited

U.S. PATENT DOCUMENTS

| 4,438,210 A | 3/1984 | Rittler |
| 5,030,593 A | 7/1991 | Heithoff |

(Continued)

FOREIGN PATENT DOCUMENTS

| EP | 2088130 | 8/2000 |
| JP | 2001316132 A | 4/2003 |

(Continued)

OTHER PUBLICATIONS

International Search Report and Written Opinion of the International Searching Authority; PCT/EP2016/062071; dated July 28, 2016, European Patent Office.

(Continued)

*Primary Examiner* — Karl E Group
(74) *Attorney, Agent, or Firm* — Dinsmore & Shohl LLP

(57) ABSTRACT

The object of the present application is β-quartz glass-ceramics (having very interesting optical, thermal expansion and feasibility properties), the articles including said glass-ceramics; the precursor glasses of said glass-ceramics, as well as the methods for elaborating said glass-ceramics and said articles. Said glass-ceramics having a composition, free, except for inevitable trace amounts, of arsenic oxide, antimony oxide and rare earth oxide, which contains, expressed in percentages by weight of oxides: 64 to 70% of $SiO_2$, 18 to 24% of $Al_2O_3$, 4 to 5% of $Li_2O$, 0 to 0.6% of $SnO_2$, >1.9 to 4% of $TiO_2$, 1 to 2.5% of $ZrO_2$, 0 to 1.5% of MgO, 0 to 3% of ZnO, >0.3 to 1 of CaO, 0 to 3% of BaO, 0 to 3% of SrO, with BaO+SrO≤3%, 0 to 1.5% of $Na_2O$, 0 to 2% of $K_2O$, with 0.2<(MgO+$Na_2O$+$K_2O$)/$Li_2O$≤1, 0 to 3% of $P_2O_5$, less than 250 ppm of $Fe_2O_3$; and their crystallites, present in said β-quartz solid solution, have an average size (Continued)

of less than 40 nm, advantageously less than 35 nm, very advantageously less than 30 nm.

13 Claims, 1 Drawing Sheet

(56) References Cited

U.S. PATENT DOCUMENTS

| | | | |
|---|---|---|---|
| 5,070,045 | A | 12/1991 | Comte et al. |
| 6,846,760 | B2 | 1/2005 | Siebers et al. |
| 6,930,289 | B2 | 8/2005 | Siebers et al. |
| 7,153,795 | B2 | 12/2006 | Comte et al. |
| 7,507,681 | B2 | 3/2009 | Aitken et al. |
| 8,053,381 | B2 | 11/2011 | Siebers et al. |
| 8,143,179 | B2 | 3/2012 | Aitken et al. |
| 8,685,873 | B2 | 4/2014 | Siebers et al. |
| 8,759,239 | B2 | 6/2014 | Comte et al. |
| 8,765,619 | B2 * | 7/2014 | Brunet ............. C03B 32/02 501/4 |
| 9,067,820 | B2 * | 6/2015 | Chauvel-Melscoet ............. C03C 3/085 |
| 9,126,859 | B2 | 9/2015 | Nakane et al. |
| 9,156,727 | B2 | 10/2015 | Siebers et al. |
| 9,650,286 | B2 * | 5/2017 | Comte ............. C03C 3/087 |
| 10,562,808 | B2 | 2/2020 | Siebers et al. |
| 2002/0023463 | A1 * | 2/2002 | Siebers ............. C03C 10/0045 65/99.5 |
| 2008/0227616 | A1 | 9/2008 | Peuchert et al. |
| 2009/0018007 | A1 | 1/2009 | Siebers et al. |
| 2009/0286667 | A1 | 11/2009 | Siebers et al. |
| 2011/0041011 | A1 | 2/2011 | Wada et al. |
| 2011/0071011 | A1 | 3/2011 | Fujisawa et al. |
| 2012/0085336 | A1 * | 4/2012 | Brunet ............. C03C 3/087 126/211 |
| 2013/0225388 | A1 | 8/2013 | Nakane et al. |
| 2014/0135201 | A1 * | 5/2014 | Chauvel-Melscoet ............. C03C 3/085 501/4 |
| 2015/0197444 | A1 * | 7/2015 | Comte ............. C03C 3/087 428/220 |
| 2017/0203998 | A1 * | 7/2017 | Comte ............. C03C 3/087 |
| 2017/0260086 | A1 * | 9/2017 | Plevacova ............. C03C 3/087 |

FOREIGN PATENT DOCUMENTS

| | | | |
|---|---|---|---|
| JP | 2011256109 A | | 12/2011 |
| WO | 2005058766 A1 | | 6/2005 |
| WO | 2010136731 A2 | | 12/2010 |
| WO | 2012020678 A1 | | 2/2012 |
| WO | 2012066948 A1 | | 5/2012 |
| WO | WO-2012156444 A1 * | 11/2012 | ............. C03C 3/087 |
| WO | 2013171288 A1 | | 11/2013 |

OTHER PUBLICATIONS

European Patent Application No. 16725173.5; Examination Report dated Feb. 6, 2020; European Patent Office; 4 Pgs.
English Translation of CN201680031408.2 Office Action dated Mar. 16, 2020; 11 Pages; Chinese Patent Office.
English Translation of JP2017561826 Office Action dated Jun. 3, 2020; 3 Pages; Japanese Patent Office.
English Translation of Chinese Application No. 201680031408.2 Office Action dated Nov. 2, 2020.

* cited by examiner

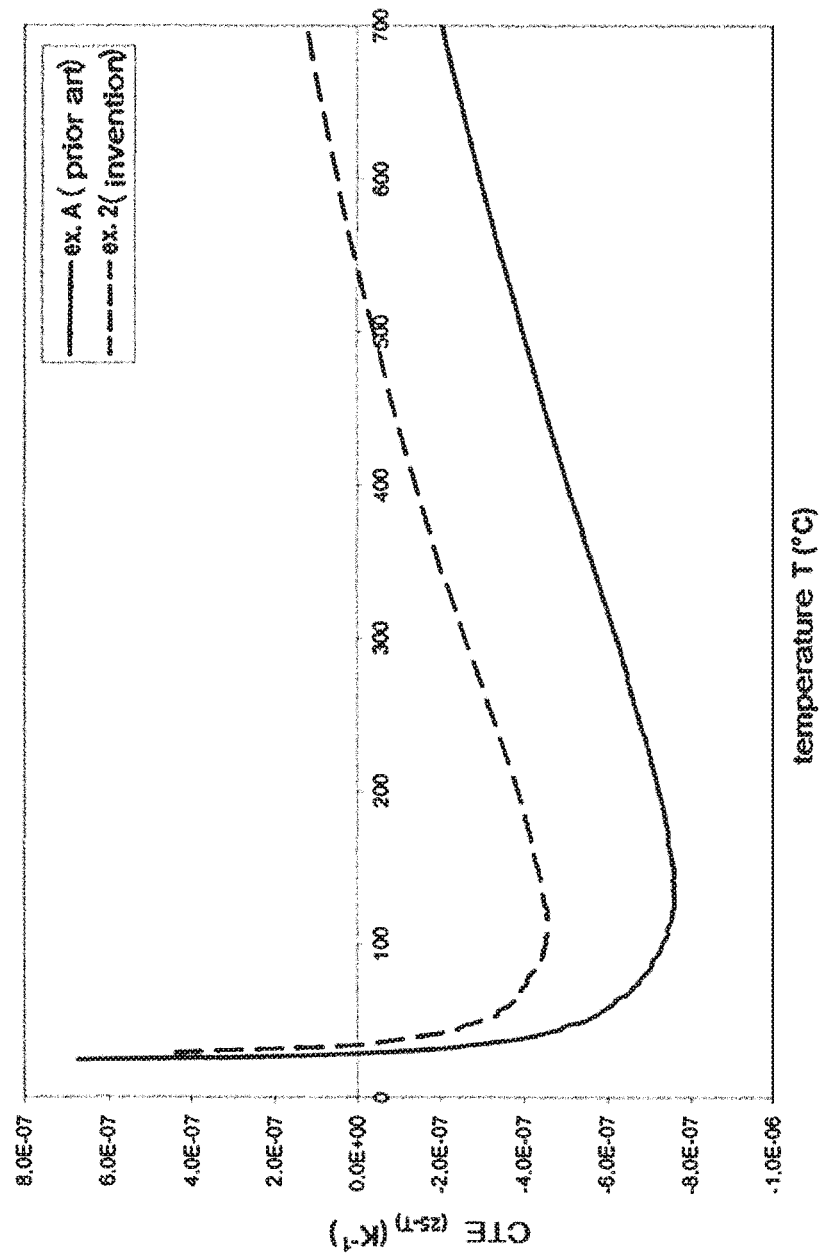

TRANSPARENT, ESSENTIALLY COLORLESS, TIN-FINED LAS GLASS-CERAMICS WITH IMPROVED MICROSTRUCTURE AND THERMAL EXPANSION PROPERTIES

The context of the present application is the one of β-quartz glass-ceramics. The present application more particularly relates to:

glass-ceramics, of the lithium aluminosilicate (LAS) type, containing a solid solution of β-quartz as main crystalline phase; said glass-ceramics containing neither $As_2O_3$ nor $Sb_2O_3$ in their composition and having very interesting properties: very interesting optical properties (transparency, absence of coloration and non-scattering properties), very interesting thermal expansion properties and very interesting manufacturing characteristics (melting, forming);

articles in said glass-ceramics;

lithium aluminosilicate glasses, precursors of such glass-ceramics; as well as methods for elaborating said glass-ceramics and said articles in said glass-ceramics.

Low thermal expansion glass-ceramics containing a solid solution of β-quartz as main crystalline phase (often referred as β-quartz glass-ceramics) are useful, for example, as cooktops, cooking utensils, microwave oven soles, chimney windows, fireplace inserts, stove and oven windows, notably of pyrolysis or catalysis ovens, shieldings, fireproof glazings, notably integrated into a door or a window or used as a partition. Such glass-ceramics may be colored (e.g., black cooktops) or transparent and colorless (e.g., fire-proof glazings, cooking hobs for induction heating (with colored lower layers which are desirably perfectly visible), stove and oven windows and shieldings).

In order to obtain such glass-ceramics (more specifically for removing gaseous inclusions in the bulk of precursor molten glass), conventional fining agents: $As_2O_3$ and/or $Sb_2O_3$ have been used in conventional glass-ceramic compositions. The use of these conventional fining agents is notably illustrated in patent documents U.S. Pat. Nos. 4,438,210, 5,070,045 and WO 2005/058766. Considering the toxicity of $As_2O_3$ and the increasingly strict regulations in effect, the use of this toxic fining compound was no longer desired in the making of the precursor glass. For environmental considerations, the use of $Sb_2O_3$ and the use of halogens such as F and Br, which would have been able to be used at least partly, substituted for said conventional fining agent $As_2O_3$ are also no longer desired.

$SnO_2$ may be used as a substitution fining agent (for $As_2O_3$ and $Sb_2O_3$). Patent application US 2011/0071011 and patents U.S. Pat. Nos. 6,846,760, and 8,053,381 describe glass-ceramic compositions which contain $SnO_2$ as a fining agent.

The use of $SnO_2$ as a fining agent however has drawbacks. For example, this compound is less efficient than $As_2O_3$ (and, in absolute terms, it should therefore be used in a relatively large amount to offset this inefficiency, which is not without posing problems, more particularly devitrification problems) and it is responsible for the occurrence of an undesirable yellowish coloration during ceramming. This yellowish coloration is particularly undesirable when obtaining of transparent and essentially colorless glass-ceramics is targeted (the present application being concerned with such an obtaining of transparent and essentially colorless glass-ceramics while patent applications EP 2 088 130 and WO 2010/136731 are concerned with colored glass-ceramics). This yellowish coloration results from Ti—Fe interactions (by charge transfer) and it was observed that these interactions were increased in the presence of tin. Precursor glass compositions of glass-ceramics generally contain $TiO_2$, as a nucleation agent, and also iron, brought as an impurity (for example, by raw materials and glass cullet). Thus, a need exists for a transparent and essentially colorless glass-ceramic composition that avoids this undesirable yellowish coloration phenomenon.

U.S. Pat. No. 8,053,381 (already mentioned above) and U.S. Pat. No. 8,685,873 describe the use of expensive color compensation agent(s) which are detrimental to the light transmission of glass-ceramics.

U.S. Pat. Nos. 8,759,239 and 8,143,179 describe limiting, or even avoiding, the presence of $TiO_2$ within the composition of the precursor glasses.

Application WO 2013/171288 describes transparent, essentially colorless and non-scattering β-quartz glass-ceramics. Their composition contains $SnO_2$ as a fining agent and no MgO or only a low content of MgO.

Patent applications WO 2012/020678 and WO 2012/066948 describe glass-ceramics, for which the precursor glass is fined with $Sno_2$, used, for example, as an oven window.

In such a context, the applicant proposes new β-quartz glass-ceramics, the composition of which therefore contains neither $As_2O_3$ nor $Sb_2O_3$ (said composition not containing either any halogens). These novel glass-ceramics have optical properties, most particularly properties of light transmission, of non-scattering of light and of low residual coloration, which are of great interest. These novel glass-ceramics are transparent, essentially colorless and non-scattering. These new glass-ceramics are easily obtained, even on an industrial scale, as their precursor glasses have low viscosity at a high temperature, a low liquidus temperature and a high liquidus viscosity, compatible with their forming method and can be crystallized carrying out short duration ceramming cycles (the presence, in their composition, of an effective amount of nucleation agents, notably of $TiO_2$, is appropriate). The good results obtained, as regards the optical properties and the easy conditions for obtaining them, are of the level of those obtained with the glass-ceramics described in application WO 2013/171288. The obtaining of said good results, however, is based on a totally different approach (see hereafter) and this notably insofar that an additional stipulation (relating to the CTE) had to be taken into account. The glass-ceramics of the present application, in addition to their highly interesting optical properties and the ease for obtaining them, have also highly interesting thermal expansion properties. The new glass-ceramics of the present application therefore comply with a specification comprising numerous stipulations, more particularly:

obtaining them from low cost raw materials (their composition is free of any expensive exotic elements, more particularly free of rare earth oxide, such as $Nd_2O_3$), a composition free of any As, Sb, halogens, highly interesting optical properties: a high transparency (a total luminous transmittance (TL) of more than 81%, or even more than 84%, for a thickness of 5 mm), a very low yellow index (YI) (=an essentially colorless nature) (less than 14, or even less than 12, for a thickness of 5 mm), and a low scattering level (a haze percentage of less than 2.5%, or even less than 1.5%, for a thickness of 5 mm), ease for obtaining them: low viscosity at high temperature ($T_{@30\ Pa \cdot s}$<1,640° C.) of their precursor glasses, low liquidus temperature (of said precursor glasses) (<1,400° C.), a high liquidus viscosity (of said precursor glasses) (generally >300 Pa·S), and ceramming cycles (of said precursor glasses) possibly of short duration (less than 3 h), and a low $CTE_{25°C.-[300-700°C.]}$ (between + and $-3.5·10^7 K^{-1}$). It should be noted that this stipulation relating to the thermal expansion coefficient (CTE) is stricter than ordinarily. It is imposed between 25° C. and any temperature from 300 to 700° C. On this matter, the annexed FIG. 1 may be considered. This stipulation is most particularly required with reference to specific applications (of glass-ceramics) requiring a resistance to thermal shocks in different temperature ranges.

According to its first object, the present application therefore relates to glass-ceramics:

of the lithium aluminosilicate type (LAS): they contain $Li_2O$, $Al_2O_3$ and $SiO_2$ as essential constituents of the β-quartz solid solution (see above);

containing a β-quartz solid solution as a main crystalline phase: the β-quartz solid solution represents more than 80% by weight of the total crystallized fraction. It even generally represents more than 90% by weight of said total crystallized fraction; and complying with the specification above (more particularly with the stipulations of said specification related to the optical properties and the CTE) in a particularly satisfactory way.

In a characteristic way:

the composition of glass-ceramics of the present application, free, except for inevitable trace amounts, of arsenic oxide, antimony oxide and rare earth oxide, contains, expressed as percentages by weight of oxides:

64 to 70% of $SiO_2$,
18 to 24% of $Al_2O_3$,
4 to 5% of $Li_2O$,
0 to 0.6% of $Sno_2$,
>1.9 to 4% of $TiO_2$,
1 to 2.5% of $ZrO_2$,
0 to 1.5% of MgO,
0 to 3% of ZnO,
>0.3 to 1% of CaO,
0 to 3% of BaO,
0 to 3% of SrO, with BaO+SrO≤3%,
0 to 1.5% of $Na_2O$,
0 to 2% of $K_2O$, with 0.2≤(MgO+$Na_2O$+$K_2O$)/$Li_2O$≤1,
0 to 3% of $P_2O_5$,
less than 250 ppm of $Fe_2O_3$, and the crystallites present in the β-quartz solid solution (in large majority in the crystalline phase) have an average size of less than 40 nm, advantageously less than 35 nm, very advantageously less than 30 nm.

This notion of average crystallite size is familiar to one skilled in the art. Conventionally, it is measured by using a Rietvelt refinement of X-ray diffraction spectra.

The composition of the glass-ceramics (of type LAS) of the present application contains:

from 64 to 70% of $SiO_2$,
from 18 to 24% of $Al_2O_3$, and
from 4 to 5% of $Li_2O$.

The $SiO_2$ content (≥64%) should be suitable for obtaining a sufficiently viscous precursor glass, in order to limit devitrification problems. The $SiO_2$ content is limited to 70% insofar that the higher the $SiO_2$ content, the more difficult it is to melt the composition. Said content is advantageously between 64 and 68% (limits included).

As regards $Al_2O_3$: excessive amounts (>24%) make the composition more capable of devitrification (mullite or other crystalline phases), which is not desirable. Conversely, too low amounts (<18%) are unfavorable for nucleation and forming small β-quartz crystallites. A content between 20 and 24% (limits included) is advantageous;

$Li_2O$: excessive amounts (>5%) are favorable to devitrification while too low amounts (<4%) significantly increase the high temperature viscosity. A content of more than 4% is advantageous. In a characteristic way, the glass-ceramics of the present application therefore contain, most particularly with reference to their low viscosity at a high temperature, a substantial amount of $Li_2O$ (4-5%, advantageously>4-5%).

The composition of the glass-ceramics of the present application contains neither $As_2O_3$ nor $Sb_2O_3$, or only contains trace amounts of at least one of these toxic compounds; $SnO_2$ is generally present instead and in place of these conventional fining agents (see hereafter). If trace amounts of at least one of these compounds are present, this is as impurities. This is for example due to the presence, in the vitrifiable charge (=batch mixture) of raw materials, of recycled materials (for example old glass-ceramics fined with these compounds). In any case, only trace amounts of these toxic compounds may be present: $As_2O_3$+$Sb_2O_3$<1,000 ppm. A similar remark applies for halogens. No halogen is used as raw material; only trace amounts of halogen(s) may be present (at less than 1,000 ppm).

The composition of the glass-ceramics of the present application does not either contain any rare earth oxide, i.e. coloring agents (oxides), such as $Nd_2O_3$, able to ensure the role of a discoloration agent or compensation coloring agent, in the presence of $SnO_2$ as a fining agent. The inevitable trace amounts, able to be present, do not correspond to an effective amount with regard to discoloration.

In the presence of said $Sno_2$, a (chemical) fining agent, in order to obtain the sought result—most particularly highly interesting light transmission, non-scattering and low residual coloration properties—the inventors propose an original approach:

different, in the absence of a rare earth oxide (see above), from that according to U.S. Pat. Nos. 8,053,381 and 8,685,873, different from that according to U.S. Pat. Nos. 8,759,239 and 8,143,179, insofar that the composition of the glass-ceramics of the present application contain a substantial amount of $TiO_2$, and also different from those according to applications WO 2013/171288, WO 2012/020678 and WO 2012/066948.

The compositions of the glass-ceramics of the present application contain:

generally an effective amount of a fining agent: from 0.1 to 0.6% of $SnO_2$ (incidentally it is noted here that the present application encompasses glass-ceramics free of $SnO_2$ or with a small amount (<0.1%) of $SnO_2$ in their composition). The precursor glasses of said glass-ceramics may quite be fined thermally or essentially thermally. One skilled in the art, however, is aware that thermal fining (or essentially thermal fining), notably on an industrial scale, is much more delicate to apply than thermal and chemical fining (with $Sno_2$) and the glass-ceramics of the present application therefore generally comprise $Sno_2$, in an effective amount, as a fining agent, with the problems that the presence of said $SnO_2$ imply (see above)), and effective amounts of nucleation agents: more than 1.9 to 4% of $TiO_2$ and from 1 to 2.5% of $ZrO_2$ (see hereafter).

The original approach of the inventors (with most particularly reference to the numerous stipulations of the specification listed above) is essentially based 1) on the combined presence of $Li_2O$ and CaO in substantial amounts, with the listed condition on the (MgO+$Na_2O$+$K_2O$)/$Li_2O$ ratio, 2) on the presence of a low $Fe_2O_3$ content (less than 250 ppm) and 3) on the presence of small β-quartz crystallites.

1) The inventors have shown the benefit of associating $Li_2O$, CaO, MgO, $Na_2O$ and $K_2O$ in the indicated amounts.

2) An $Fe_2O_3$ content<250 ppm gives the possibility of limiting Ti—Fe interactions, thereby minimizing color and maximizing light transmission.

3) It was also observed that a small average size of β-quartz crystallites (<40 nm, advantageously <35 nm and very advantageously <30 nm) is favorable for obtaining high light transmission, low coloration and low scattering level. This small average size of crystallites is related to the quality of the nucleation, therefore to the presence of nucleation agents: $TiO_2$, in an amount more than 1.9 to 4% by weight (advantageously from 2 to 3% by weight) and $ZrO_2$, in an amount from 1 to 2.5% by weight (advantageously between 1.5 and 2% by weight) and to the ceramming heat treatment. Moreover it is known that the fining agent, $SnO_2$ (generally present, see above), is also involved in the nucleation process.

As for the low scattering level (haze percentage) exhibited by the glass-ceramics of the present application, it is also related to the size of the crystallites, as well as to their number. It also depends on the quality of nucleation, and therefore on the presence of the nucleation agents and on the ceramming heat treatment.

The glass-ceramics of the present application therefore in a characteristic way exhibit:

crystallites (present in the β-quartz solid solution, in large majority in the crystalline phase) of an average size of less than 40 nm, advantageously less than 35 nm, very advantageously less than 30 nm (these values may be compared with the 40-61 nm values given for the exemplified crystallites of the glass-ceramics of U.S. Pat. No. 6,846,760), and a composition, free of $As_2O_3$, $Sb_2O_3$, halogens and rare earth oxide, which contains (in addition to $SiO_2$, $Al_2O_3$ and $Li_2O$, in the weight percentages indicated above):

+advantageously $Sno_2$, as a fining agent, in an amount from 0.1 to 0.6% (very advantageously from 0.1 to 0.4%) by weight: the presence of $SnO_2$ (in the absence of conventional fining agents) is advantageous with reference to the application of the fining (see above). Said $Sno_2$, a (chemical) fining agent, also contributes to nucleation. However, it intervenes in a limited amount (0.6%), with reference to the technical problem of the ('yellow'') coloration of the glass-ceramics (see above) and also with reference to the technical problem of devitrification at a high temperature. We recall here that the present application also encompasses glass-ceramics free of $SnO_2$ or with a small amount (<0.1%) of $SnO_2$ in their composition. Said glass-ceramics are thermally or essentially thermally fined. Their highly satisfactory optical properties are obtained without any difficulties. Very interestingly, they meet the other stipulations of the specification above;

+$TiO_2$ and $ZrO_2$, as nucleation agents, in an amount of more than 1.9 to 4% (advantageously 2 to 3%) by weight for $TiO_2$ and of 1 to 2.5% (advantageously 1.5 to 2%) by weight for $ZrO_2$. The presence of $ZrO_2$ allows limitation of the presence of $TiO_2$. Said $TiO_2$ is present in an adequate amount for the sought effect on nucleation (within a reasonable time) but in a limited amount with reference to the technical coloration problem (explained above). Said $ZrO_2$ completes the action of said $TiO_2$ on nucleation but cannot intervene in a larger amount insofar that it then generates devitrification problems. Within the composition of the glass-ceramics of the present application, in reference to the size of the crystallites and to the duration of the ceramming, the total amount of nucleation agents ($TiO_2$+$ZrO_2$) is opportunely superior to 3.8% by weight (>3.8%), advantageously superior or equal to 4% by weight (≥4%), very advantageously superior or equal to 4.2% by weight (≥4.2%), indeed superior or equal to 4.5% by weight (≥4.5%);

+MgO: in an amount from 0 to 1.5% by weight (advantageously at least 0.1% by weight, very advantageously from 0.1 to 0.5% by weight). MgO advantageously intervenes with CaO and also $Na_2O$ and $K_2O$ (see the listed condition) for obtaining interesting sought values of the thermal expansion coefficient. Present at more than 1.5% by weight, it is responsible for too high values of said thermal expansion coefficient and for yellow coloration;

+ZnO: in an amount from 0 to 3% by weight (advantageously at least 0.1% by weight, very advantageously from 0.1 to 1.5% by weight). ZnO advantageously reinforces the action of $Li_2O$ for obtaining low viscosity at a high temperature. ZnO should not be used at more than 3% by weight, with reference to the optical properties and to the sought thermal expansion coefficient values.

It was seen above that MgO and ZnO each intervenes independently, advantageously at at least 0.1% by weight. It is highly recommended, in any case, that a minima MgO+ZnO represent at least 0.1% by weight;

+CaO: this ingredient is present in a substantial amount (more than 0.3% by weight), with reference most particularly to the sought interesting values of the thermal expansion coefficient, and not excessively (at most 1% by weight), with reference most particularly to the sought optical properties. It also intervenes with $Na_2O$ for obtaining a low liquidus temperature of the precursor glass, with $Na_2O$ and $K_2O$ for obtaining low viscosity at a high temperature of the precursor glass. It is advantageously present from 0.4 to 0.7% by weight;

+BaO and SrO: each in an amount from 0 to 3% by weight (advantageously from 0.5 to 1.5% by weight, for each of them present). SrO is generally not present, as an added raw material, insofar as it is an expensive product. In such a context (SrO not present as an added raw material), if SrO is present, it is only in inevitable trace amounts (<1000 ppm) added as impurity contained in at least one of the used raw material or in a used cullet). Excessive amounts of BaO and/or SrO (more than 3% by weight) may generate glass-ceramics with a high residual glass content, having a yellow coloration;

+$Na_2O$ and $K_2O$: respectively in an amount from 0 to 1.5% by weight for $Na_2O$ and from 0 to 2% by weight for $K_2O$. Beyond these indicated maximum amounts, the thermal expansion coefficient is too high, the sought optical properties are compromised (occurrence of a color and of scattering). The presence of either one or both of these elements is not mandatory but it is however recalled that the condition 0.2≤(MgO+$Na_2O$+$K_2O$)/$Li_2O$≤1 should be observed, with reference to the stipulation of the specification related to said thermal expansion coefficient. It may be noted that $Na_2O$ also intervenes advantageously with CaO, with reference to the low liquidus temperature of the glass-ceramics of the present application;

+$P_2O_5$: in an amount from 0 to 3% by weight. $P_2O_5$ beneficially intervenes as a manufacturing auxiliary product for promoting dissolution of $ZrO_2$ and for limiting devitrification. However it is able to damage the optical properties and its possible presence is generally inferior to 1% by weight, in any case limited to 3% by weight. According to an advantageous alternative, the composition of the glass-ceramics according to the present application is free of $P_2O_5$ (except obviously for inevitable trace amounts (<1000 ppm), able to come as an impurity from at least one of the used raw material or from a used cullet);

+$Fe_2O_3$: less than 250 ppm (advantageously less than 200 ppm, very advantageously less than 180 ppm; it is generally difficult to go below 100 ppm because of the presence of iron in the raw materials used). In fact, the compositions of the glass-ceramics of the present application generally contain from 100 to less than 200 ppm of $Fe_2O_3$. One understood here that the Ti—Fe transfer of charges (which is responsible for the coloration (which one seeks to minimize, or even to avoid)) has to be limited. It is insisted on the fact that the glass-ceramics of the present application have very interesting optical properties without requiring a very low $Fe_2O_3$ level in their compositions.

With reference to the particular stipulation on the thermal expansion coefficient (low $CTE_{25° C.-[300-700° C.]}$ (between + and $-3.5 \cdot 10^7 K^{-1}$)), it was understood that CaO is present and that $Li_2O$, MgO, $Na_2O$ and $K_2O$ meet the condition $0.2 \leq (MgO+Na_2O+K_2O)/Li_2O \leq 1$. Below a value of 0.2 for this ratio, the glass-ceramics have too negative thermal expansion coefficients ($<-3.5 \cdot 10^7 K^{-1}$); beyond a value of 1 for this ratio, the glass-ceramics have too high thermal expansion coefficients ($>3.5 \cdot 10^7 K^{-1}$).

According to a particularly advantageous alternative, the composition of the glass-ceramics of the present application, free, except for inevitable trace amounts, of arsenic oxide, of antimony oxide, of rare earth oxide, of strontium oxide and of phosphorus oxide, contains, expressed in weight percentages of oxides:

64 to 68% of $SiO_2$,
20 to 24% of $Al_2O_3$,
>4 to 5% of $Li_2O$,
0.1 to 0.4% of $Sno_2$,
2 to 3% of $TiO_2$,
1.5 to 2% of $ZrO_2$,
0.1 to 0.5 of MgO,
0.1 to 1.5% of ZnO,
>0.3 to 1% of CaO,
0.5 to 1.5% of BaO,
0 to 1.5% of $Na_2O$,
0 to 2% of $K_2O$, with $0.2 \leq (MgO+Na_2O+K_2O)/Li_2O \leq 1$, and less than 200 ppm of $Fe_2O_3$.

The ingredients entering or able to enter the composition of the glass-ceramics of the present application, identified above ($SiO_2$, $Al_2O_3$, $Li_2O$, $Sno_2$, $TiO_2$, $ZrO_2$, MgO, ZnO, CaO, BaO, SrO, $Na_2O$, $K_2O$, $P_2O_5$ and $Fe_2O_3$), may quite represent 100% by weight of the composition of the glass-ceramics of the present application but the presence of at least one other compound in a small amount (less than or equal to 3% by weight), not substantially affecting the properties of the glass-ceramics (neither their interesting optical properties, nor their low CTE), cannot a priori be totally excluded. The following compounds may notably be present, at a total content of less than or equal to 3% by weight, each of them having a total content of less than or equal to 2% by weight: $Nb_2O_5$, $Ta_2O_5$, $WO_3$ and $MoO_3$. In reference to the absence of coloration sought (a very low yellow index being sought), no coloring agent, such as $V_2O_5$ is obviously used as a raw material for the glass-ceramics of the application. Concerning said prohibited use of coloring agents, an exception (a single exception) has however to be made for CoO. CoO may be present (added) for optimizing the optical properties. CoO is an inexpensive coloring oxide (it is not a rare earth oxide), the presence of which in a very small amount ($\leq$30 ppm, generally $\leq$10 ppm), may further improve a yellow index already quite small. The presence of more than 30 ppm of CoO gives the glass-ceramic a pink color and decreases the light transmission.

The ingredients entering or which may enter the composition of the glass-ceramics of the present application, identified above ($SiO_2$, $Al_2O_3$, $Li_2O$, $Sno_2$, $TiO_2$, $ZrO_2$, MgO, ZnO, CaO, BaO, SrO, $Na_2O$, $K_2O$, $P_2O_5$ and $Fe_2O_3$) therefore represents at least 97% by weight, or even at least 98% by weight, or even at least 99% by weight, or even 100% by weight (see above) of the composition of the glass-ceramics of the present application.

It is recalled for all practical purposes, that the glass-ceramics of the present application are of the lithium aluminosilicate (LAS) type and that they contain a β-quartz solid solution as a main crystalline phase; said β-quartz solid solution representing more than 80% by weight of the total crystallized fraction. In fact, said β-quartz solid solution generally represents more than 90% by weight of said total crystallized fraction. The composition of said glass-ceramics is free of, except for inevitable trace amounts, $As_2O_3$, $Sb_2O_3$ and rare earth oxide (and also halogens).

The glass-ceramics of the present application therefore satisfactorily meet the different stipulations of the specification, which are listed above. Said glass-ceramics of the present application (the precursor glass of which has been advantageously fined with an effective amount of $Sno_2$), which are transparent, essentially colorless and non-scattering, therefore have the optical properties recalled hereafter:

a total luminous transmittance, for a thickness of 5 mm, of more than 81%, advantageously more than 84%; this parameter (TL, expressed in %) quantifies transparency. It is known to one skilled in the art. It is defined by the ASTM D1003-13 standard. Standard total luminous transmittance measurements cover the spectral range from 380-780 nm;

a yellow index, for a thickness of 5 mm, of less than 14, advantageously less than 12 (and very advantageously less than 10). This parameter (YI), known to one skilled in the art, quantifies the intensity of the residual yellow coloration. Values of this index of less than 14 characterize glass-ceramics having a very low residual coloration. The formula for calculating this index, known to one skilled in the art, is the following: $YI_{ASTM\ D}\ 1925=[100\times(1.28X-1.06Z)]/Y$, wherein X, Y and Z represent the tristimulus coordinates of the sample, calculated for a CIE illuminant C and an observer at 2°, and a haze percentage (measuring the scattering level), for a thickness of 5 mm, of less than 2.5%, advantageously less than 1.5%. It is understood that the lower the scattering, better is the appearance (and therefore the optical quality) of the material. Haze is calculated in the following way: Haze (%)=(Tdiffuse/Ttotal)×100, Tdiffuse being the diffuse transmittance (%) and Ttotal being the total transmittance (%). The haze measurement is carried out according to the ASTM D1003-13 standard (with the use of an integrating sphere). This is known to one skilled in the art. Said one skilled in the art, or even the lambda witness, is aware in any case, of how to appreciate with the naked eye, the diffusing or non-diffusing nature of a material.

Said glass-ceramics of the present application further have a low thermal expansion coefficient (CTE), more specifically a thermal expansion coefficient (CTE) between 25° C. and any temperature between 300 and 700° C. ($CTE_{25° C.-[300-700° C.]}$) between + and $-3.5 \cdot 10^7 K^{-1}$.

In this respect, the glass-ceramics of the present application are of particular interest. Moreover the ease with which they are obtained is recalled (see above) upon considering the properties of their precursor glasses (see above and below).

According to its second object, the present application relates to articles at least partly, advantageously totally consisting of a glass-ceramic of the present application as described above. Said articles advantageously consist in totality of a glass-ceramic of the present application. Said articles may notably consist in a chimney window, in a chimney insert, in a stove or oven window, notably of pyrolysis or catalysis owens, in a cooktop (for heating by induction with colored lower layers, which are desirably perfectly visible), in a shielding or in a fire-proof glazing (notably, integrated into a door or a window or used as a partition). Of course it is quite understood that the glass-ceramics of the present application are logically used a priori in contexts where their optical properties and their advantageous thermal expansion properties are opportune.

According to a third object, the present application relates to lithium aluminosilicate (LAS) glasses, precursors of the glass-ceramics of the present application, as described above. Said glasses have in a characteristic way, a composition which gives the possibility of obtaining said glass-ceramics. Said glasses generally have a composition which corresponds to that of said glass-ceramics but the matching is not necessarily complete insofar that one skilled in the art perfectly realizes that the heat treatments imposed to the glasses for obtaining glass-ceramics may somewhat affect the composition of the material.

According to advantageous variants:
the composition of said glasses contains at least 0.1% of ZnO, advantageously from 0.1 to 1.5% of ZnO; and/or
the composition of said glasses contains less than 1% of $P_2O_5$, the composition of said glasses is advantageously free, except for inevitable trace amounts, of $P_2O_5$.

Said glasses are particularly of interest in that they have an advantageous high temperature viscosity (low viscosity) as well as interesting devitrification properties, compatible with the application of forming methods by rolling and floating. It was seen above that said glasses have a low high temperature viscosity ($T_{@30\ Pa\cdot s}$<1,640° C.), a low liquidus temperature (<1,400° C.), a high liquidus viscosity (>300 Pa·s). Moreover, it is possible to obtain from said precursor glasses of the present application, glass-ceramics of the present application by applying short duration (of less than 3 h) ceramming cycles. The glasses of the present application are conventionally obtained by melting the raw materials entering their composition (in adequate proportions).

According to its fourth and fifth objects, the present application respectively relates to a method for elaborating a glass-ceramic of the present application, as described above and a method for elaborating an article, at least partly consisting of a glass-ceramic of the present application, as described above.

Said methods are methods by analogy.

Conventionally, said method for elaborating a glass-ceramic comprises the heat treatment of a vitrifiable batch mixture of raw materials, advantageously containing $SnO_2$ as a fining agent, under conditions which successively ensure melting, fining (thermal fining ($SnO_2$=0) (or essentially thermal fining ($SnO_2$<0.1%)), advantageously thermal and chemical fining ($SnO_2$≥0.1%)) and ceramming by a first nucleation step and a second step for growing the crystals. Both of the successive steps for obtaining a fined glass (precursor of the glass-ceramic) and for ceramming said fined glass may be applied in succession with each other or shifted out in time (on a same site or on different sites).

In a characteristic way, the vitrifiable (=able to vitrify) batch mixture of raw materials has a composition which gives the possibility of obtaining a glass-ceramic of the present application, having the weight composition indicated above and said ceramming is applied:
in a temperature interval between 650 and 850° C., for 15 minutes to 4 hours, for the nucleation step, and
in a temperature interval between 860 and 950° C., for 10 minutes to 2 hours, for the step for growing crystals.

The ceramming applied under the conditions above on a glass which has the indicated composition leads to the expected result, most particularly in terms of the size of the β-quartz crystallites.

Within the scope of the present application, optimization of the optical properties of the glass-ceramic may be obtained by acting on the exact composition of the charge and the parameters of the ceramming cycle.

Conventionally, said method for elaborating an article successively comprises:
melting a vitrifiable (=able to vitrify) batch mixture of raw materials, said batch mixture advantageously containing $SnO_2$ as a fining agent; followed by fining (thermal fining ($SnO_2$=0) (or essentially thermal fining ($Sno_2$<0.1%)), advantageously thermal and chemical fining ($Sno_2$≥0.1%)) of the obtained molten glass;
cooling the obtained fined molten glass and simultaneously shaping it into the desired shape for the targeted article;
a heat treatment for ceramming said shaped glass, said heat treatment comprising a first nucleation step and a second step for growing crystals.

Both of these successive steps for obtaining a fined shaped glass (precursor of the article in glass-ceramic) and for ceramming said fined shaped glass may be applied in succession with each other or shifted out in time (on the same site or different sites).

In a characteristic way, the vitrifiable (=able to vitrify) charge of raw materials has a composition which gives the possibility of obtaining a glass-ceramic of the present application, having the weight composition as indicated above and the ceramming heat treatment is applied:
in a temperature interval between 650 and 850° C., for 15 minutes to 4 hours, for the nucleation step, and
in a temperature interval between 860 and 950° C., for 10 minutes to 2 hours, for the step for growing crystals.

The ceramming applied under the conditions above on a glass which has the indicated composition leads to the expected results, most particularly in terms of the size of the β-quartz crystallites.

Within the scope of the present application, optimization of the optical properties of the glass-ceramic may be obtained by acting on the composition of the charge and on the parameters of the ceramming cycle.

It is incidentally recalled here that the methods may or may not use an effective amount of $Sno_2$. An effective amount on $SnO_2$ (0.1-0.6%: see above) is advantageously used.

The general remarks may be worded hereafter, concerning the indicated ceramming cycle.

The ceramming heat treatment, as characterized above, ensures nucleation (a nucleation step applied at 650° C. at least) and the obtaining of a glass-ceramic containing a β-quartz solid solution as a main crystalline phase (a step for growing crystals applied at a temperature not beyond 950° C.).

If the nucleation temperature interval is not suitable (i.e. out of the 650-850° C. range) or the time in this interval is too short (of less than 15 min), an insufficient number of seeds are formed and the material then tends to be diffusing.

Moreover, if the growth temperature is too low (of less than 860° C.), the obtained glass-ceramics tend to have large scattering, and if said growth temperature is on the contrary too high (i.e. >950° C.), the obtained glass-ceramics tend to become opaque.

Let us note here that obtaining the glass-ceramics of the present application from a precursor glass shaped by floating is not excluded. However the float glass method (floating) is not preferred as it is usually carried out for high production volumes and as it is able to be harmful for the light transmission of the glass-ceramics produced. The inventors recommend other shaping methods such as rolling.

It is now proposed that the present application be illustrated by the examples hereafter.

BRIEF DESCRIPTION OF THE DRAWINGS

The appended FIG. 1 illustrates the variation of the thermal expansion coefficient (CTE) between 25 (° C.) and a temperature T (° C.), versus temperature (T), for a glass-ceramic of the prior art (glass-ceramic of the comparative example A hereafter (=glass-ceramic according to WO 2013/171288)) and a glass-ceramic of the present application (that of Example 2 hereafter). Considering both curves shows the benefit of the present application:

the glass-ceramic of example A has a CTE between 25 and 700° C. ($CTE_{25° C.-700° C.}$=-2.1×10$^{-7}$K$^{-1}$), which is in the sought range but a CTE between 25 and 300° C. ($CTE_{25° C.-300° C.}$=-6.2×10$^{-7}$K$^{-1}$) which is too low;

the glass-ceramic of example 2 has suitable CTEs ($CTE_{25° C.-700° C.}$=1.2×10$^{-7}$K$^{-1}$ et $CTE_{25° C.-300° C.}$=-2.6×10$^{-7}$K$^{-1}$).

Following tables 1-A and 1-B show that the glass-ceramics of the application have suitable $CTE_{25° C.-700° C.}$ and $CTE_{25° C.-300° C.}$ values. This is due to the close control of their composition, to the combined effect of the amounts of their different constitutive elements ($Li_2O$, CaO, MgO, $Na_2O$ and $K_2O$ being more particularly concerned).

EXAMPLES

In order to produce 1 kg batches of precursor glass, the raw materials, in the proportions (proportions expressed in oxides) reported in the first portion of tables 1 (1-A and 1-B) and 2 (2-A and 2-B) hereafter, were mixed carefully.

The mixtures were placed for melting in platinum crucibles. The crucibles containing these mixtures were then introduced into an oven preheated to 1,550° C. There, they were subject to a melting cycle of the type hereafter:
rise in temperature from 1,550° C. to 1,670° C., in 1 h;
maintaining them for 5 h 30 min, at 1,670° C.

The crucibles were then taken out of the oven and the molten glass was poured onto a preheated steel plate. It was laminated thereon down to a thickness of 6 mm. Glass plates were thereby obtained. They were annealed at 650° C. for 1 hour and then slowly cooled.

The properties of the obtained glasses are indicated in the second portion of the tables 1 (1-A and 1-B) and 2 (2-A and 2-B) hereafter.

The viscosities were measured with a rotary viscosimeter (Gero).

$T_{30\ Pa·s}$ (° C.) corresponds to the temperature at which the viscosity of the glass is 30 Pa·s.

$T_{liq}$ (° C.) is the liquidus temperature. In fact, the liquidus is given by a range of associated temperatures and viscosities: the highest temperature corresponds to the minimum temperature at which no crystal is observed, the lowest temperature at the maximum temperature at which crystals are observed.

The devitrification characteristics (low and high liquidus temperatures) were determined in the following way. Glass samples (0.5 cm$^3$) were subject to the following heat treatment:
introduction into an oven preheated to 1,430° C.,
maintaining this temperature for 30 min,
cooling down to the test temperature T, at a rate of 10° C./min,
maintaining this temperature for 17 h,
quenching the samples.

The possibly present crystals were observed with optical microscopy.

The ceramming cycle applied is specified hereafter:
rise in temperature from room temperature (25° C.) to 650° C. at a heating rate of 30° C./min;
raising the temperature from 650° C. to 820° C. within 40 min (ramp of 4.3° C./min);
raising the temperature from 820 to 900° C. within 17 min (ramp of 4.7° C./min);
maintaining this temperature of 900° C. for 15 min,
lowering the temperature with the thermal inertia of the oven.

The properties of the obtained glass-ceramics are indicated in the last portion of tables 1 (1-A and 1-B) and 2 (2-A and 2-B) hereafter.

Total and diffuse luminous transmittance measurements were conducted under 5 mm by using a Varian spectrophotometer (Cary 500 Scan model), equipped with an integrating sphere. From these measurements, the luminous transmittance (TL %) and the scattering level (Haze %) were measured according to the ASTM D 1003-13 standard (under illuminant C with observation at 2°). For glass-ceramics of examples 3 and 6, measurements have also been carried out on 4 mm thick samples. The results obtained are respectively indicated in Table 1-A and in Table 1-B in brackets.

The yellow index (YI) was calculated according to the transmittance measurements (color points) according to the ASTM D1925 standard under the illuminant C.

The β-quartz phase percentage (relatively to the total crystallized fraction) as well as the average size of the n-quartz crystals is obtained by using a Rietvelt refinement of the X-ray diffraction spectra. The number between brackets indicates said average size of the crystals in nanometers.

The CTEs (thermal expansion coefficients) (between room temperature (25° C.) and 300° C.=$CTE_{25° C.-300° C.}$ and between room temperature (25° C.) and 700° C.=$CTE_{25° C.-700° C.}$) were measured with a high temperature dilatometer (DIL 402C, Netzsch), at a heating rate of 3° C./min, on glass-ceramic samples in the form of rods.

Examples 1 to 9 (table 1-A and 1-B) illustrate the present application. Example 3 is preferred. Examples 3, 7, 8 and 9 relate to glasses and glass-ceramics of similar compositions, containing variable iron contents (140 ppm, 100 ppm, 170 ppm and 220 ppm of $Fe_2O_3$, respectively). Iron essentially acts on the optical properties of the glass-ceramics concerned (neither on the ceramming, nor on the thermal expansion coefficient). The optical properties of the glass-ceramic of Example 9 remain interesting.

Examples A to E (table 2-A and 2-B) are comparative examples.

The comparative example A corresponds to a glass-ceramic according to the application WO 2013/171288. The composition of this glass-ceramic does not contain any CaO, it does not either meet the required condition: $0.2 \leq (MgO+K_2O+Na_2O)/Li_2O \leq 1$ for the compositions of the glass-ceramics of the present application. This glass-ceramic has a too negative $CTE_{25° C.-300° C.}$ value.

The composition of the glass-ceramic of the comparative example B only contains 3.55% of $Li_2O$. The temperature of the glass (precursor of said glass-ceramic) for a viscosity of 30 Pa·s, is high.

The composition of the glass-ceramic of comparative example C contains less than 63% of $SiO_2$, and 4.81% of ZnO: the temperature of the glass (precursor of said glass-ceramic), for a viscosity of 30 Pa·s, is only 1,573° C. but the glass-ceramic has a yellow color. Said composition which contains 4.81% of ZnO, does not contain any CaO, any MgO, any $K_2O$, any $Na_2O$: the $CTE_{25° C.-700° C.}$ and $CTE_{25° C.-300° C.}$ values of said glass-ceramic are unsatisfactory.

The composition of the glass-ceramic of the comparative example D only differs from the compositions of the glass-ceramics of the present application insofar that it does not meet the required condition: $0.2 \leq (MgO+K_2O+Na_2O)/Li_2O \leq 1$. Indeed, according to this composition: $(MgO+K_2O+Na_2O)/Li_2O=0.142$. The $CTE_{25° C.-300° C.}$ value of the glass-ceramic is too low.

The composition of the glass-ceramic of the comparative example E contains too much MgO. This glass-ceramic does not have interesting CTE values and optical properties.

TABLE 1-A

|  | Examples | | | |
|---|---|---|---|---|
|  | 1 | 2 | 3 | 4 |
| $SiO_2$ | 65.029 | 64.856 | 65.026 | 65.334 |
| $Al_2O_3$ | 22.76 | 22.69 | 22.72 | 22.83 |
| $Li_2O$ | 4.09 | 4.05 | 4.18 | 4.2 |
| MgO | 0.31 | 0.18 | 0.31 | 0.31 |
| ZnO | 0.5 | 0.81 | 0.19 | 0.19 |
| BaO | 0.54 | 0.54 | 1.22 | 0 |
| SrO | 0 | 0 | 0 | 0 |
| $TiO_2$ | 2.78 | 2.77 | 2.77 | 2.78 |
| $ZrO_2$ | 1.84 | 1.83 | 1.83 | 1.84 |
| $SnO_2$ | 0.3 | 0.3 | 0.3 | 0.3 |
| $Na_2O$ | 0.26 | 0 | 0.26 | 0.26 |
| $K_2O$ | 1.06 | 1.44 | 0.75 | 1.51 |
| CaO | 0.52 | 0.52 | 0.43 | 0.43 |
| $P_2O_5$ | 0 | 0 | 0 | 0 |
| $Fe_2O_3$ | 0.011 | 0.014 | 0.014 | 0.016 |
| $(MgO + K_2O + Na_2O)/Li_2O$ | 0.399 | 0.4 | 0.316 | 0.495 |
| Properties of the glass | | | | |
| $T_{30Pa \cdot s}$ (° C.) |  |  | 1624 | 1624 |
| $T_{liq}$ (° C.) | 1330-1350 |  | 1340-1350 | 1328-1347 |
| Viscosity at $T_{liq}$ (Pa · s) |  |  | 816-704 | 956-721 |
| Property of the glass-ceramic | | | | |
| TL (%) | 84.8 | 84.9 | 85.7 (86.1) | 85.3 |
| Y.I. | 9.2 | 9.6 | 8.1 (6.9) | 9.9 |
| Haze (%) | 0.02 | 0.23 | 0.37 |  |
| $CTE_{25° C.-300° C.}$ $(K^{-1})$ | −2.3E−07 | −2.6E−07 | −3.4E−07 | −1.3E−07 |
| $CTE_{25° C.-700° C.}$ $(K^{-1})$ | 1.3E−07 | 1.2E−07 | 1.1E−08 | 2.2E−07 |
| β-quartz % (nm) | 94 (27) | 95 (27) | 94 (28) | 96 (27) |

TABLE 1-B

|  | Examples | | | | |
|---|---|---|---|---|---|
|  | 5 | 6 | 7 | 8 | 9 |
| $SiO_2$ | 65.155 | 66.285 | 65.03 | 65.023 | 65.018 |
| $Al_2O_3$ | 22.77 | 22.19 | 22.72 | 22.72 | 22.72 |
| $Li_2O$ | 4.14 | 4.18 | 4.18 | 4.18 | 4.18 |
| MgO | 0.31 | 0.94 | 0.31 | 0.31 | 0.31 |
| ZnO | 0.31 | 0 | 0.19 | 0.19 | 0.19 |
| BaO | 0.54 | 0 | 1.22 | 1.22 | 1.22 |
| SrO | 0 | 0.81 | 0 | 0 | 0 |
| $TiO_2$ | 2.78 | 2.73 | 2.77 | 2.77 | 2.77 |
| $ZrO_2$ | 1.84 | 1.92 | 1.83 | 1.83 | 1.83 |
| $SnO_2$ | 0.3 | 0.30 | 0.30 | 0.30 | 0.30 |
| $Na_2O$ | 0.26 | 0.19 | 0.26 | 0.26 | 0.26 |
| $K_2O$ | 1.06 | 0 | 0.75 | 0.75 | 0.75 |
| CaO | 0.52 | 0.44 | 0.43 | 0.43 | 0.43 |
| $P_2O_5$ | 0 | 0 | 0 | 0 | 0 |
| $Fe_2O_3$ | 0.015 | 0.015 | 0.010 | 0.017 | 0.022 |
| $(MgO + K_2O + Na_2O)/Li_2O$ | 0.394 | 0.27 | 0.32 | 0.32 | 0.32 |
| Properties of the glass | | | | | |
| $T_{30Pa \cdot s}$ (° C.) | 1626 |  |  |  |  |
| $T_{liq}$ (° C.) | 1341-1356 |  |  |  |  |
| Viscosity at $T_{liq}$ (Pa · s) | 774-624 |  |  |  |  |
| Property of the glass-ceramic | | | | | |
| TL (%) | 85.3 | 84.56 (85.56) | 86.0 | 84.9 | 84.3 |
| Y.I. | 9.6 | 10.81 (8.63) | 7.1 | 9.4 | 10.4 |
| Haze (%) | 0.32 | 0.33 | 0.35 | 0.19 | 0.25 |
| $CTE_{25° C.-300° C.}$ $(K^{-1})$ | −2.7E−07 | −1.8E−07 |  |  |  |
| $CTE_{25° C.-700° C.}$ $(K^{-1})$ | 1.0E−07 | 0.8E−07 |  |  |  |
| β-quartz % (nm) | 96 (28) | 96 (29) | 96 (28) | 97 (27) |  |

TABLE 2-A

| | Examples | | |
|---|---|---|---|
| | A | B | C |
| $SiO_2$ | 63.997 | 64.872 | 62.237 |
| $Al_2O_3$ | 22.39 | 22.4 | 21.78 |
| $Li_2O$ | 4.13 | 3.55 | 4.02 |
| MgO | 0 | 0.75 | 0 |
| ZnO | 0.8 | 0 | 4.81 |
| BaO | 3.6 | 1.3 | 2.31 |
| $TiO_2$ | 2.73 | 2.1 | 2.73 |
| $ZrO_2$ | 1.8 | 2.5 | 1.8 |
| $SnO_2$ | 0.29 | 0.29 | 0.3 |
| $Na_2O$ | 0.25 | 0.4 | 0 |
| $K_2O$ | 0 | 0.29 | 0 |
| CaO | 0 | 0.04 | 0 |
| $P_2O_5$ | 0 | 1.5 | 0 |
| $Fe_2O_3$ | 0.013 | 0.008 | 0.013 |
| $(MgO + K_2O + Na_2O)/Li_2O$ | 0.061 | 0.406 | 0 |
| Properties of the glass | | | |
| $T_{30Pa \cdot s}$ (° C.) | 1617 | 1653 | 1573 |
| $T_{liq}$ (° C.) | 1342-1354 | 1391-1410 | 1305-1328 |
| Viscosity at $T_{liq}$ (Pa · s) | 771-645 | 529-410 | 623-452 |
| Property of the glass-ceramic | | | |
| TL (%) | 85.7 | 85.4 | Very yellow |
| Y.I. | 8.5 | 9.1 | |
| Haze (%) | 0.23 | 0.63 | |
| $CTE_{25° C.-300° C.}$ ($K^{-1}$) | -6.2E-07 | -1.1E-07 | -1.3E-06 |
| $CTE_{25° C.-700° C.}$ ($K^{-1}$) | -2.1E-07 | 1.0E-07 | -8.6E-07 |
| β-quartz % (nm) | 95 (26) | 95 (38) | 95 (35) |

TABLE 2-B

| | Examples | |
|---|---|---|
| | D | E |
| $SiO_2$ | 64.667 | 67.265 |
| $Al_2O_3$ | 22.59 | 20.90 |
| $Li_2O$ | 4.01 | 4.10 |
| MgO | 0.31 | 1.91 |
| ZnO | 0.83 | 0 |
| BaO | 2.06 | 0 |
| $TiO_2$ | 2.75 | 2.77 |
| $ZrO_2$ | 1.82 | 1.88 |
| $SnO_2$ | 0.3 | 0.31 |
| $Na_2O$ | 0.26 | 0 |
| $K_2O$ | | 0 |
| CaO | 0.39 | 0.88 |
| $P_2O_5$ | 0 | 0 |
| $Fe_2O_3$ | 0.013 | 0.015 |
| $(MgO + K_2O + Na_2O)/Li_2O$ | 0.142 | 0.47 |
| Properties of the glass | | |
| $T_{30Pa \cdot s}$ (° C.) | | |
| $T_{liq}$ (° C.) | | |
| Viscosity at $T_{liq}$ (Pa· s) | | |
| Property of the glass-ceramic | | |
| TL (%) | 84.3 | 80.37 |
| Y.I. | 9.3 | 24.13 |
| Haze (%) | | 0.36 |
| $CTE_{25° C.-300° C.}$ ($K^{-1}$) | -5.1E-07 | 3.9E-07 |
| $CTE_{25° C.-700° C.}$ ($K^{-1}$) | -1.6E-07 | 6.1E-07 |
| β-quartz % (nm) | | |

The invention claimed is:

1. A lithium aluminosilicate glass-ceramic, containing a β-quartz solid solution as main crystalline phase, characterized in that:

its composition, free, except for inevitable trace amounts, of arsenic oxide, antimony oxide and rare earth oxide, contains, expressed as weight percentages of oxides:

64 to 70% of $SiO_2$,
18 to 24% of $Al_2O_3$,
4 to 5% of $Li_2O$,
0 to 0.6% of $SnO_2$,
>1.9 to 4% of $TiO_2$,
1 to 2.5% of $ZrO_2$,
0.1 to 1.5% of MgO,
0 to 3% of ZnO,
>0.3 to 1 of CaO,
0 to 1.5% of BaO,
0 to 3% of SrO, with BaO +SrO ≤3%,
0 to 1.5% of $Na_2O$,
0 to 2% of $K_2O$, with $0.2 \leq (MgO+Na_2O+K_2O)/Li_2O \leq 1$,
0 to 3% of $P_2O_5$,
less than 200 ppm of $Fe_2O_3$; and the crystallites present in said β-quartz solid solution have an average size of less than 40 nm;

wherein the lithium aluminosilicate glass-ceramic has:

a total luminous transmittance, for a thickness of 5 mm, of more than 81%, a yellow index, for a thickness of 5 mm, of less than 14 and a haze percentage, for a thickness of 5 mm, of less than 2.5%; and a thermal expansion coefficient between 25° C. and any temperature between 300 and 700° C. ($CTE_{25°C.}$ -$[_{300-700}]$) between + and -3.5, $10^7 K^{-1}$.

2. The lithium aluminosilicate glass-ceramic according to claim 1, the composition of which contains from 0.1 to 0.6% of $SnO_2$.

3. The lithium aluminosilicate glass-ceramic according to claim 1, the composition of which contains more than 4% of $Li_2O$.

4. The lithium aluminosilicate glass-ceramic according to claim 1, the composition of which contains from 2 to 3% of $TiO_2$.

5. The lithium aluminosilicate glass-ceramic according to claim 1, the composition of which contains at least 0.1% of MgO and/or ZnO.

6. The lithium aluminosilicate glass-ceramic according to claim 1, the composition of which contains at least 0.1% of ZnO.

7. The lithium aluminosilicate glass-ceramic according to claim 1, the composition of which contains less than 1% of $P_2O_5$.

8. The lithium aluminosilicate glass-ceramic according to claim 1, the composition of which, free, except for inevitable trace amounts, of arsenic oxide, antimony oxide, of rare earth oxide, of strontium oxide and of phosphorous oxide, contains, expressed in weight percentages of oxides:

64 to 68% of $SiO_2$,
20 to 24% of $Al_2O_3$,
>4 to 5% of $Li_2O$,
0.1 to 0.4% of $SnO_2$,
2 to 3% of $TiO_2$,
1.5 to 2% of $ZrO_2$,
0.1 to 0.5% of MgO,
0 to 1.5% of ZnO,
>0.3 to 1 of CaO,
0 to 1.5% of BaO,
0 to 1.5% of $Na_2O$,
0 to 2% of $K_2O$, with $0.2 \leq (MgO+Na_2O+K_2O)/Li_2O \leq 1$, less than 200 ppm of $Fe_2O_3$.

9. An article at least partly consisting of a lithium aluminosilicate glass-ceramic according to claim 1, consisting in a chimney window, in a fireplace insert, in a stove or oven window, in a cooktop, in a shielding or in a fireproof glazing.

10. A method for elaborating a glass-ceramic according to claim 1, comprising the heat treatment of a vitrifiable batch mixture of raw materials, under conditions which successively ensure melting, fining and ceramming by a first nucleation step and a second step for growing crystals, characterized in that said batch mixture has a composition with which the glass-ceramic can be obtained; and in that said ceramming is applied:

in a temperature interval between 650 and 850° C., for 15 minutes to 4 hours, for the nucleation step, and in a temperature interval between 860 and 950° C., for 10 minutes to 2 hours, for the step for growing crystals.

11. A method for elaborating an article according to claim 9, successively comprising:

melting a vitrifiable batch mixture of raw materials to form a molten glass, followed by fining of the obtained molten glass;

cooling the obtained fined molten glass and simultaneously shaping it into the desired shape;

a heat treatment for ceramming said shaped glass, said heat treatment comprising a first nucleation step and a second step for growing crystals;

characterized in that said batch mixture has a composition with which the glass-ceramic can be obtained; and in that the heat treatment for ceramming is applied:

in a temperature interval between 650 and 850° C., for 15 minutes to 4 hours, for nucleation step, and in a temperature interval between 860 and 950° C., for 10 minutes to 2 hours, for the step for growing crystals.

12. The method according to claim 11, characterized in that said vitrifiable batch mixture of raw materials contains $SnO_2$ as a fining agent.

13. The lithium aluminosilicate glass-ceramic according to claim 1, the composition of which contains from 100 ppm to less 200 ppm of $Fe_2O_3$.

* * * * *

UNITED STATES PATENT AND TRADEMARK OFFICE
CERTIFICATE OF CORRECTION

| | |
|---|---|
| PATENT NO. | : 10,961,146 B2 |
| APPLICATION NO. | : 15/577980 |
| DATED | : March 30, 2021 |
| INVENTOR(S) | : Estelle Molieres et al. |

It is certified that error appears in the above-identified patent and that said Letters Patent is hereby corrected as shown below:

In the Claims

In Column 16, Line 6, Claim 1, delete "Li$_2$ O," and insert -- Li$_2$O, --, therefor.

In Column 16, Line 14, Claim 1, delete "BaO +SrO" and insert -- BaO+SrO --, therefor.

In Column 16, Lines 30-31, Claim 1, delete "(CTE$_{25°}$ C. $-[_{300-700}$ ])" and insert -- (CTE$_{25° C. -[300-700° C.]}$) --, therefor.

In Column 16, Line 31, Claim 1, delete "–3.5, 10$^7$K $^{-1}$." and insert -- –3.5·10$^7$K$^{-1}$. --, therefor.

In Column 16, Line 40, Claim 4, delete "TiO $_2$." and insert -- TiO$_2$. --, therefor.

Signed and Sealed this
Twenty-sixth Day of April, 2022

Katherine Kelly Vidal
*Director of the United States Patent and Trademark Office*